United States Patent
Kim et al.

(10) Patent No.: US 9,676,986 B2
(45) Date of Patent: Jun. 13, 2017

(54) ADHESIVE COMPOSITION FOR HEAT DISSIPATING ADHESIVE TAPE, AND HEAT DISSIPATING ADHESIVE TAPE

(71) Applicant: LG Chem, Ltd., Seoul (KR)

(72) Inventors: Ji-Hye Kim, Bucheon-si (KR); Byung-Ho Ra, Uijeongbu-si (KR); Jang-Soon Kim, Seongnam-si (KR)

(73) Assignee: LG Chem, Ltd. (KR)

( * ) Notice: Subject to any disclaimer, the term of this patent is extended or adjusted under 35 U.S.C. 154(b) by 0 days.

(21) Appl. No.: 15/025,542

(22) PCT Filed: Mar. 16, 2015

(86) PCT No.: PCT/KR2015/002522
§ 371 (c)(1),
(2) Date: Mar. 28, 2016

(87) PCT Pub. No.: WO2015/147470
PCT Pub. Date: Oct. 1, 2015

(65) Prior Publication Data
US 2016/0215195 A1   Jul. 28, 2016

(30) Foreign Application Priority Data
Mar. 25, 2014   (KR) .................. 10-2014-0034687

(51) Int. Cl.
| | |
|---|---|
| *C09K 5/08* | (2006.01) |
| *C09J 7/02* | (2006.01) |
| *C09J 133/06* | (2006.01) |
| *C09J 9/00* | (2006.01) |
| *C09K 5/14* | (2006.01) |

(52) U.S. Cl.
CPC ....... *C09K 5/08* (2013.01); *C09J 7/02* (2013.01); *C09J 9/00* (2013.01); *C09J 133/06* (2013.01); *C09K 5/14* (2013.01); *C08L 2312/06* (2013.01); *C09J 2201/602* (2013.01); *C09J 2203/326* (2013.01); *C09J 2400/20* (2013.01); *C09J 2433/00* (2013.01)

(58) Field of Classification Search
CPC ..................... C09K 5/08; C09J 7/02
See application file for complete search history.

(56) References Cited

U.S. PATENT DOCUMENTS

2008/0295959 A1   12/2008  Ishigaki et al.

FOREIGN PATENT DOCUMENTS

| | | | | |
|---|---|---|---|---|
| JP | 62018481 A | * | 1/1987 | ............... C09D 5/24 |
| JP | 2012180495 A | | 9/2012 | |
| KR | 20080062440 A | | 7/2008 | |
| KR | 20080094282 A | | 10/2008 | |
| KR | 20090084836 A | | 8/2009 | |
| KR | 20090098726 A | | 9/2009 | |
| KR | 20100075723 A | | 7/2010 | |
| WO | 2013066597 A1 | | 5/2013 | |

OTHER PUBLICATIONS

International Search Report mailed Jul. 24, 2015 corresponding to International Application No. PCT/KR2015/002522.

* cited by examiner

*Primary Examiner* — Robert Harlan
(74) *Attorney, Agent, or Firm* — Lerner, David, Littenberg, Krumholz & Mentlik, LLP

(57) ABSTRACT

Provided is an adhesive composition for a heat dissipating adhesive tape, the adhesive composition comprising a (meth)acrylic acid ester based photocurable resin, a thermal conductive filler, and a benzotriazole-based compound.

15 Claims, No Drawings

ADHESIVE COMPOSITION FOR HEAT DISSIPATING ADHESIVE TAPE, AND HEAT DISSIPATING ADHESIVE TAPE

CROSS REFERENCE TO RELATED APPLICATION

This application claims the priority of Korean Patent Application No. 10-2014-0034687, filed on Mar. 25, 2014 in the KIPO (Korean Intellectual Property Office). Further, this application is the National Phase application of International Application No. PCT/KR2015/002522 filed Mar. 16, 2015, which designates the United States and was published in Korean.

TECHNICAL FIELD

The present invention relates to an adhesive composition for a heat dissipating adhesive tape and a heat dissipating adhesive tape.

BACKGROUND ART

In general, electronic devices such as computers, portable personal digital assistants (PDAs), and communicators cannot release excessive heat generated in the system, and thus potentially have serious problems in terms of afterimages and system stability. Such heat may shorten lifespan of a product or generate failure or malfunction of the product, and in some serious cases, the heat may become a cause of explosion or fire. In particular, the heat may decrease degrees of color or clarity on plasma display panels or LCD monitors, which are in increasing demand, and thus reliability and stability of the products may also deteriorate. Thus, the heat generated from the inside of the system needs to be released outside or cooled by itself.

Various methods have been tried to efficiently control the heat, and one of the methods is using an adhesive tape having a heat dissipating function by heat transfer and heat dispersion effects.

DISCLOSURE

Technical Problem

It is an aspect of the present invention to provide an adhesive composition for a heat dissipating adhesive which suppresses metal corrosion.

It is an aspect of the present invention to provide a heat dissipating adhesive tape prepared by using the adhesive composition.

Technical Solution

In accordance with one aspect of the present invention, an adhesive composition for a heat dissipating adhesive tape includes a (meth)acrylic acid ester-based photocurable resin; a thermal conductive filler; and a benzotriazole-based compound.

The (meth)acrylic acid ester-based photocurable resin may be a copolymer of a (meth)acrylic acid ester-based monomer and a functional group-containing cross-linking monomer.

The functional group-containing cross-linking monomer may be a hydroxyl group-containing cross-linking monomer.

For example, the hydroxyl group-containing cross-linking monomer may include at least one selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate, and a combination thereof.

The hydroxyl group-containing cross-linking monomer may be polymerized at an amount ratio in a range of about 0.1 wt % to about 50 wt % in monomer components that constitute the (meth)acrylic acid ester-based photocurable resin.

The (meth)acrylic acid ester-based photocurable may be free of a carboxylic group.

For example, the (meth)acrylic acid ester-based monomer may include at least one selected from the group consisting of methyl(meth)acrylate, ethyl(meth)acrylate, n-propyl (meth)acrylate, isopropyl(meth)acrylate, n-butyl(meth)acrylate, t-butyl(meth)acrylate, sec-butyl(meth)acrylate, pentyl (meth)acrylate, 2-ethylhexyl(meth)acrylate, 2-ethylbutyl (meth)acrylate, n-octyl(meth)acrylate, isooctyl(meth) acrylate, isobornyl(meth)acrylate, isononyl(meth)acrylate, and a combination thereof.

For example, the benzotriazole-based compound may include at least one selected from the group consisting of octyl 3-3(tert-butyl-4-hydroxy-5-(5-chloro-2H-benzotriazol-2-yl_phenyl)propionate, 2-ethylhexyl 3-[3-(5-chlorobenzotriazol-2-yl)-4-hydroxy-5-tert-butyl-phenyl]propanoate, 2-(2H-benzotriazol-2-yl)-6-(dodecyl)-4-methylphenol, 2-(2H-benzotriazol-2-yl)-p-cresol, 2-(2H-benzotriazol-2-yl)-4,6-ditertpentylphenol, 2-(2-hydroxyphenyl)-benzotriazol, 2-(2H-benzotriazol-2-yl)-4,6-bis(1-methyl-1-phenylethyl)phenol, 2-(2H-benzotriazol-2-yl)-6-(1-methyl-1-phenylethyl)-4-(1,1,3,3-tetramethylbutyl)-phenol, and a combination thereof.

An amount of the benzotriazole-based compound may be in a range of about 0.1 part to about 5.0 parts by weight based on 100 parts by weight of the (meth)acrylic acid ester-based photocurable resin.

The thermal conductive filler may be an inorganic filler including at least one selected from the group consisting of a metal oxide, a metal hydroxide, a metal nitride, a metal carbide, a metal boride, and a combination thereof.

An amount of the thermal conductive filler may be in a range of about 50 parts to about 300 parts by weight based on 100 parts by weight of the (meth)acrylic acid ester-based photocurable resin.

A thermal conductivity of a adhesive tape prepared by using the adhesive composition may be in a range of about 0.5 W/mK to about 1.0 W/mK. The adhesive composition for a heat dissipating adhesive tape may further include a photo initiator and a curing agent.

The photo initiator may include at least one selected from the group consisting of a benzoin-based initiator, a hydroxy ketone-based initiator, an aminoketone-based initiator, a caprolactam-based initiator, and a combination thereof.

The adhesive composition for a heat dissipating adhesive tape may further include an additive that comprises at least one selected from a filler, a surfactant, a tackifier, a coupling agent, an antistatic agent, a dye, a pigment, a sunscreen, an antioxidant, a working fluid, and a combination thereof.

In accordance with one aspect of the present invention, a heat dissipating adhesive tape is prepared by using the adhesive composition.

Advantageous Effects

The present invention is capable of preparing a heat dissipating adhesive tape from an adhesive composition for a heat dissipating adhesive tape, wherein the heat dissipating adhesive tape significantly suppresses metal corrosion upon contact with a metal.

BEST MODE

Hereinafter, one or more embodiments of the present invention will be described in detail. However, the present exemplary embodiments may have different forms and should not be construed as being limited to the descriptions set forth herein, but the scope of the present invention is defined by the following claims.

According to one embodiment of the present invention, provided is an adhesive composition for a heat dissipating adhesive tape, and the adhesive composition comprises a (meth)acrylic acid ester-based photocurable resin, a thermal conductive filler, and a benzotriazole-based compound.

The adhesive composition for a heat dissipating adhesive tape is an adhesive composition for preparing a heat dissipating adhesive tape, and the heat dissipating adhesive tape is a bonding material that is used to assemble electronic devices such as displays, e.g., LEDs. The heat dissipating adhesive tape is also a thermal interface material (TIM) that may be used when a device needs to have heat dissipating performance.

Hereinafter, each component of the adhesive composition for a heat dissipating adhesive tape will be described.

The (meth)acrylic acid ester-based photocurable resin may be a copolymer of a (meth)acrylic acid ester-based monomer and a functional group-containing cross-linking monomer.

The (meth)acrylic acid ester monomer may be, for example, an alkyl(meth)acrylate, but embodiments are not limited thereto. An alkyl group of the alkyl(meth)acryate may be a linear or branched C1-C14 alkyl group, or, for example, a C1-C8 alkyl group.

In particular, the (meth)acrylic acid ester monomer may include at least one selected from methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isobornyl (meth) acrylate, isononyl (meth)acrylate, and a combination thereof.

The functional group-containing cross-linking monomer denotes a monomer including a copolymeric functional group in a molecular structure.

The functional group-containing cross-linking monomer may be, for example, a hydroxyl group-containing monomer. When a functional group of the functional group-containing cross-linking monomer is a hydroxyl group instead of a carboxyl group, a problem of the heat dissipating adhesive tape causing corrosion with respect to a metal may be prevented.

For example, a heat dissipating adhesive tape for LED may cause corrosion of a metal electrode, such as Ag, but a heat dissipating adhesive tape prepared by using the adhesive composition for a heat dissipating adhesive tape may effectively prevent such electrode corrosion.

The hydroxyl group-containing cross-linking monomer may be polymerized at an amount ratio in a range of about 0.1 wt % to about 50 wt % among monomer components that constitute the (meth)acrylic acid ester-based photocurable resin. A heat dissipating adhesive tape prepared by using the adhesive composition for a heat dissipating adhesive tape including the (meth)acrylic acid ester-based photocurable resin polymerized at an amount ratio within this range may effectively suppress corrosion with respect to a metal.

For example, the functional group-containing cross-linking monomer may include at least one selected from the group consisting of hydroxyl group-containing monomers such as 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, and 2-hydroxypropylene glycol (meth)acrylate, and a combination thereof.

The adhesive composition for a heat dissipating adhesive tape includes a benzotriazole-based compound as described above. When the adhesive composition for a heat dissipating adhesive tape includes a benzotriazole-based compound, a metal corrosion suppressing effect may further increase.

When the benzotriazole-based compound is prepared by using the functional group-containing cross-linking monomer together with the (meth)acrylic acid ester-based photocurable resin polymerized from the hydroxyl group-containing cross-linking monomer, a metal corrosion suppressing effect may further increase. Since the benzotriazole-based compound reacts with a carboxylic acid upon contact, adhesion strength of the benzotriazole-based compound may be less than the expected strength, and may affect an UV curing process, which may trouble the curing process. On the other hand, when the functional group-containing cross-linking monomer is a hydroxyl group-containing cross-linking monomer, this problem may be resolved since a reactivity of the hydroxyl group-containing cross-linking monomer with respect to the benzotriazole-based compound is low.

In one embodiment, the (meth)acrylic acid ester-based photocurable resin may not substantially contain a carboxyl group.

For example, the benzotriazole-based compound may include octyl 3-3(tert-butyl-4-hydroxy-5-(5-chloro-2H-benzotriazol-2-yl_phenyl)propionate, 2-ethylhexyl 3-[3-(5-chlorobenzotriazol-2-yl)-4-hydroxy-5-tert-butyl-phenyl] propanoate, 2-(2H-benzotriazol-2-yl)-6-(dodecyl)-4-methylphenol, 2-(2H-benzotriazol-2-yl)-p-cresol, 2-(2H-benzotriazol-2-yl)-4,6-디tert페틸phenol, 2-(2-hydroxyphenyl)-benzotriazol, 2-(2H-benzotriazol-2-yl)-4,6-bis(1-methyl-1-phenylethyl)phenol, 2-(2H-benzotriazol-2-yl)-6-(1-methyl-1-phenylethyl)-4-(1,1,3,3-tetramethylbutyl)-phenol, or a combination thereof.

The benzotriazole-based compound is a commercially available compound, and examples of the benzotriazole-based compound may include Tinuvin-P, Tinuvin-326, Tinuvin-327, Tinuvin-328, or Tinuvin-329 available from BASF.

The adhesive composition for a heat dissipating adhesive tape may include the benzotriazole-based compound at an amount in a range of about 0.1 part to about 5.0 parts by weight, or, for example, about 0.1 part to about 1.0 part by weight, based on 100 parts by weight of the (meth)acrylic acid ester-based photocurable resin. When the adhesive composition for a heat dissipating adhesive tape uses the benzotriazole-based compound at an amount within these ranges, a metal corrosion suppressing effect of the heat dissipating adhesive tape may be effectively achieved, and stability with respect to UV may be excellently maintained as well. When the amount of the benzotriazole-based compound is greater than the range, a number of radicals may be captured during preparation of an adhesive tape by UV curing due to an UV antioxidant effect of the benzotriazole-based compound, and thus physical properties of the adhesive tape may change in an undesirable direction. Also, during a photocuring process, the benzotriazole-based compound absorbs UV in competition with a photo initiator, and thus a curing efficiency may deteriorate.

As described above, the adhesive composition for a heat dissipating adhesive tape includes the thermal conductive filler. The adhesive composition for a heat dissipating adhesive tape may include the thermal conductive filler to increase a thermal conductivity so that a heat dissipating function may be invested.

For example, a thermal conductivity of a heat dissipating adhesive tape prepared by using the adhesive composition for a heat dissipating adhesive tape may be in a range of about 0.5 W/mK to about 1.0 W/mK. The heat dissipating adhesive tape having a thermal conductivity within this range may have an excellent heat dissipating effect in a high-temperature operating environment in an electronic device such as an LED.

When the thermal conductive filler is added with a (meth)acrylic acid ester-based monomer and a polar functional group-containing monomer, fire resistance in addition to thermal conductivity may be obtained. This is because the thermal conductive filler decreases an amount of a combustible copolymer and changes thermal conductivity, physical properties, and viscosity of the copolymer. Also, an inorganic material such as a magnesium hydroxide or an aluminum hydroxide is used in the thermal conductive filler, incombustible materials such as $H_2O$ and $CO_2$ may be produced as a result of an endothermic reaction that absorbs energy during a reaction with the copolymer, and thus a physical fire resisting effect may be exhibited.

An amount of the thermal conductive filler may be in a range of about 50 parts to about 300 parts by weight based on 100 parts by weight of the (meth)acrylic acid ester-based monomer. When the amount of the thermal conductive filler is within this range, the heat dissipating adhesive tape prepared by using the adhesive composition for a heat dissipating adhesive tape may have thermal conductivity that allows a heat dissipating effect to be obtained.

An average particle diameter of the thermal conductive filler may be in a range of about 1 μm to about 200 μm, or, for example, about 10 μm to about 180 μm. When the average particle diameter of the thermal conductive filler is within these ranges, the heat dissipating adhesive tape prepared by using the adhesive composition for a heat dissipating adhesive tape may have thermal conductivity that allows a heat dissipating effect to be obtained.

For example, the thermal conductive filler may be an inorganic thermal conductive filler that includes at least one selected from the group consisting of a metal oxide, a metal hydroxide, a metal nitride, a metal carbide, a metal boride, and a combination thereof. In particular, the inorganic thermal conductive filler may include an aluminum oxide, a magnesium oxide, a zinc oxide, a silicon carbide, an aluminum nitride, a boron nitride, a silicon nitride, an aluminum hydroxide, a magnesium hydroxide, or a silicon oxide.

In particular, when an aluminum hydroxide or a magnesium hydroxide is used as the inorganic thermal conductive filler, an amount of smoke generated from combusting the adhesive composition is very small, which is a positive aspect of the inorganic thermal conductive filler in terms of protecting environment, and may secure excellent fire resistance. A decomposition temperature of an aluminum hydroxide is as low as about 200° C., and thus an aluminum hydroxide is appropriate when a process temperature of the adhesive composition is low. When a process temperature of the adhesive composition is high, a magnesium hydroxide having a relatively high decomposition temperature of about 320° C. may be used. Further, when particles of the magnesium hydroxide in nanosize is used, excellent fire resistance may be secured even with a small amount of the magnesium hydroxide.

The adhesive composition for a heat dissipating adhesive tape may be prepared by adding a photo initiator and a curing agent to the (meth)acrylic acid ester-based photocurable resin, and any common additive may be added to the (meth)acrylic acid ester-based photocurable resin in addition to these additives to form a photo-cured product according to the use. Examples of the additive may include a filler, a surfactant, a tackifier, a coupling agent, an antistatic agent, a dye, a pigment, a sunscreen, an antioxidant, a working fluid, and a combination thereof.

The photo initiator and the curing agent may be any material commonly used in preparation of a photo-curable composition.

For example, the photo initiator may include at least one selected from the group consisting of a benzoin-based initiator, a hydroxy ketone-based initiator, an aminoketone-based initiator, a caprolactam-based initiator, and a combination thereof.

The curing agent may be, in particular, a diacrylate-based cross-linking agent and may include, for example, hexanediolacrylate, ethylene glycoldiacrylate, diethylene glycoldiacrylate, triethylene glycoldiacrylate, propylene glycoldiacrylate, dipropylene glycoldiacrylate, tripropylenediacrylate, or a combination thereof.

The curing agent may be any common material and is commercially available. The curing agent may be preferably used at an amount in a range of about 0.01 part to about 5 parts by weight, or, for example, about 0.1 part to about 0.5 parts by weight based on 100 parts by weight of the (meth)acrylic acid ester-based photocurable resin. When the amount of the cross-linking agent is less than about 0.01 part by weight, the cross-linking agent may negatively affect adhesion strength or weather resistance. Whereas, when the amount of the cross-linking agent is greater than about 5 parts by weight, initial adhesion strength and adhesion property may deteriorate.

Also, the adhesive composition for a heat dissipating adhesive tape may further include a common additive use used in preparation of a photo-curable composition according to the use. For example, the adhesive composition may further include an additive including at least one selected from the group consisting of a filler, a surfactant, a tackifier, a coupling agent, an antistatic agent, a dye, a pigment, a sunscreen, an antioxidant, a working fluid, and a combination thereof.

In another embodiment of the present invention provided is a heat dissipating adhesive tape prepared from the adhesive composition for a heat dissipating adhesive tape. The adhesive tape may be prepared by photo-curing the adhesive composition or, for example, by coating the adhesive composition on a substrate or a release film and then photo-curing the resultant.

The heat dissipating adhesive tape may be used as a thermal interface material (TIM) and, in particular, may be used to attach and fix electronic members such as an LED light source in a liquid-crystal display device or a heat dissipating plate in an electronic device that release heat.

For example, the heat dissipating adhesive tape may be used to attach an LED back light assembly in a liquid-crystal display device. In the case of a liquid-crystal display device having a LED back light assembly equipped at a lower part of the device, the heat dissipating adhesive tape may be used as a medium attached on a cover bottom of a bottom surface of the liquid-crystal display device.

In another embodiment, the heat dissipating adhesive tape may be disposed between an IC chip and a heat dissipating plate so that the heat dissipating plate is attached on the IC chip.

Thereinafter, one or more embodiments will be described in detail with reference to the following examples. However, these examples are not intended to limit the scope of the one or more embodiments.

EXAMPLE

Example 1

95 parts by weight of 2-ethylhexylacrylate (EHA) and 5 parts by weight of 2-hydroxyethylacrylate (HEA), as a functional group-containing cross-linking monomer, were added to a 1 L glass reactor, and the content in the reactor was thermally polymerized to obtain an acryl-based photo-cured resin syrup having a viscosity of 350 cP. 0.5 parts by weight of a,a-methoxy-a-hydroxyacetophenone (Irgacure 651, available from BASF), as a photoinitiator, and 0.35 parts by weight of 1,6-hexanedioldiacrylate, as a cross-linking agent, based on 100 parts by weight of the acryl-based photo-cured resin syrup were mixed and sufficiently stirred. 100 parts by weight of an aluminum hydroxide powder (H-100, available from Showa Denko) having an average particle diameter of 70 µm, as a thermal conductive filler, was further added thereto, and 0.5 parts by weight of a benzotriazole-based compound (Tinuvin 328) was added, and the mixture was sufficiently stirred until it was homogenous to prepare an adhesive composition for a heat dissipating adhesive tape. Subsequently, the adhesive composition for a heat dissipating adhesive tape was degassed with reduced pressure by using a vacuum pump. Then, the adhesive composition for a heat dissipating adhesive tape was coated/cured on release paper by using a micro bar to prepare an adhesion sheet having a thickness of 200 µm. Also, the resultant was irradiated with UV light by using an UV lamp to prepare a sample of a heat dissipating adhesive tape.

Example 2

An acryl foam adhesive tape was prepared in the same manner as in Example 1, except that 80 parts by weight of 2-ethylhexylacrylate (EHA) and 20 parts by weight of 2-hydroxyethylacrylate (HEA), as a functional group-containing cross-linking monomer, were polymerized to obtain and use an acryl-based photo-cured resin syrup.

Comparative Example 1

An acryl foam adhesive tape was prepared in the same manner as in Example 1, except that a benzotriazole-based compound (Tinuvin 328) was not used.

Comparative Example 2

An acryl foam adhesive tape was prepared in the same manner as in Example 1, except that an aluminum hydroxide powder (H-100, available from Showa Denko), as a thermal conductive filler, was not used.

Evaluation

Experiment Example 1

Samples of the heat dissipating adhesive tapes prepared in Examples 1 and 2 and Comparative Examples 1 and 2 were prepared in a size of 20 cm$^2$, each of the samples was put into a completely sealable 30 ml glass vial, and an LED cell was added thereto. The resultant was placed in an oven at a temperature of 120° C. and remained therein for 1 week. Color change of the LED electrode was confirmed to evaluate whether corrosion occurred or not, and the results are shown in Table 1.

TABLE 1

| Sample | Corrosion occurrence |
|---|---|
| Example 1 | Not occurred |
| Example 2 | Not occurred |
| Comparative Example 1 | Occurred |
| Comparative Example 2 | Not occurred |

As shown in Table 1, it may be confirmed that the heat dissipating adhesive tapes prepared in Examples 1 and 2 had a significant corrosion suppressing effect, unlike the heat dissipating adhesive tape prepared in Comparative Example 1 without using the benzotriazole-based compound.

Experimental Example 2

Samples of the heat dissipating adhesive tapes prepared in Examples 1 and 2 and Comparative Examples 1 and 2 were each cut into a size of 60 mm×120 mm, and a thermal conductivity of the sample was measured by using a rapid thermal conductivity meter (available from Kyoto Electronics Manufacturing Co., Ltd.). The results are shown in Table 2.

TABLE 2

| Sample | Thermal conductivity (W/mK) |
|---|---|
| Example 1 | 0.57 |
| Example 2 | 0.56 |
| Comparative Example 1 | 0.56 |
| Comparative Example 2 | 0.32 |

As shown in Table 2, it may be confirmed that thermal conductivity of the heat dissipating adhesive tape prepared in Comparative Example 2 was lower than those of the heat dissipating adhesive tapes prepared in Examples 1 and 2.

While one or more exemplary embodiments have been described with reference to the figures, it will be understood by those of ordinary skill in the art that various changes in form and details may be made therein without departing from the spirit and scope as defined by the following claims.

The invention claimed is:

1. An adhesive composition for a heat dissipating adhesive tape, the adhesive composition comprising:
   a (meth)acrylic acid ester-based photocurable resin;
   a thermal conductive filler;
   a benzotriazole-based compound;
   a photo initiator; and
   a curing agent.

2. The adhesive composition of claim 1, wherein the (meth)acrylic acid ester-based photocurable resin is a copolymer of a (meth)acrylic acid ester-based monomer and a functional group-containing cross-linking monomer.

3. The adhesive composition of claim 2, wherein the functional group-containing cross-linking monomer is a hydroxyl group-containing cross-linking monomer.

4. The adhesive composition of claim 3, wherein the hydroxyl group-containing cross-linking monomer comprises at least one selected from the group consisting of 2-hydroxyethyl (meth)acrylate, 2-hydroxypropyl (meth)acrylate, 4-hydroxybutyl (meth)acrylate, 6-hydroxyhexyl (meth)acrylate, 8-hydroxyoctyl (meth)acrylate, 2-hydroxyethylene glycol (meth)acrylate, 2-hydroxypropylene glycol (meth)acrylate, and a combination thereof.

5. The adhesive composition of claim 3, wherein the hydroxyl group-containing cross-linking monomer is polymerized at an amount ratio in a range of about 0.1 wt % to about 50 wt % in monomer components that constitute the (meth)acrylic acid ester-based photocurable resin.

6. The adhesive composition of claim 3, wherein the (meth)acrylic acid ester-based photocurable is free of a carboxylic group.

7. The adhesive composition of claim 1, wherein the (meth)acrylic acid ester-based monomer comprises at least one selected from the group consisting of methyl(meth)acrylate, ethyl(meth)acrylate, n-propyl(meth)acrylate, isopropyl(meth)acrylate, n-butyl(meth)acrylate, t-butyl(meth)acrylate, sec-butyl(meth)acrylate, pentyl(meth)acrylate, 2-ethylhexyl(meth)acrylate, 2-ethylbutyl(meth)acrylate, n-octyl(meth)acrylate, isooctyl(meth)acrylate, isobornyl (meth)acrylate, isononyl(meth)acrylate, and a combination thereof.

8. The adhesive composition of claim 1, wherein the benzotriazole-based compound comprises at least one selected from the group consisting of octyl 3-3(tert-butyl-4-hydroxy-5-(5-chloro-2H-benzotriazol-2-yl)phenyl)propionate, 2-ethylhexyl 3-[3-(5-chlorobenzotriazol-2-yl)-4-hydroxy-5-tert-butyl-phenyl]propanoate, 2-(2H-benzotriazol-2-yl)-6-(dodecyl)-4-methylphenol, 2-(2H-benzotriazol-2-yl)-p-cresol, 2-(2H-benzotriazol-2-yl)-4,6-ditertpentylphenol, 2-(2-hydroxyphenyl)-benzotriazol, 2-(2H-benzotriazol-2-yl)-4,6-bis(1-methyl-1-phenylethyl) phenol, 2-(2H-benzotriazol-2-yl)-6-(1-methyl-1-phenylethyl)-4-(1,1,3,3-tetramethylbutyl)-phenol, and a combination thereof.

9. The adhesive composition of claim 1, wherein an amount of the benzotriazole-based compound is in a range of about 0.1 part to about 5.0 parts by weight based on 100 parts by weight of the (meth)acrylic acid ester-based photocurable resin.

10. The adhesive composition of claim 1, wherein the thermal conductive filler is an inorganic filler comprising at least one selected from the group consisting of a metal oxide, a metal hydroxide, a metal nitride, a metal carbide, a metal boride, and a combination thereof.

11. The adhesive composition of claim 1, wherein an amount of the thermal conductive filler is in a range of about 50 parts to about 300 parts by weight based on 100 parts by weight of the (meth)acrylic acid ester-based photocurable resin.

12. The adhesive composition of claim 1, wherein a thermal conductivity of a adhesive tape prepared by using the adhesive composition is in a range of about 0.5 W/mK to about 1.0 W/mK.

13. The adhesive composition of claim 1, wherein the photo initiator comprises at least one selected from the group consisting of a benzoin-based initiator, a hydroxy ketone-based initiator, an aminoketone-based initiator, a caprolactam-based initiator, and a combination thereof.

14. The adhesive composition of claim 1 further comprising an additive that comprises at least one selected from a filler, a surfactant, a tackifier, a coupling agent, an antistatic agent, a dye, a pigment, a sunscreen, an antioxidant, a working fluid, and a combination thereof.

15. A heat dissipating adhesive tape prepared by using an adhesive composition, wherein the adhesive composition comprising:
a (meth)acrylic acid ester-based photocurable resin;
a thermal conductive filler;
a benzotriazole-based compound;
a photo initiator; and
a curing agent.

* * * * *